United States Patent
Lusardi

[19]

[11] Patent Number: 6,149,971

[45] Date of Patent: *Nov. 21, 2000

[54] FIREPROOF PANEL AND METHOD FOR ITS MANUFACTURE

[75] Inventor: Adriano Lusardi, Borgotaro, Italy

[73] Assignee: Eurocompositi S.r.l., Arcola, Italy

[*] Notice: This patent issued on a continued prosecution application filed under 37 CFR 1.53(d), and is subject to the twenty year patent term provisions of 35 U.S.C. 154(a)(2).

[21] Appl. No.: 08/762,303

[22] Filed: Dec. 9, 1996

Related U.S. Application Data

[63] Continuation of application No. 08/315,564, Sep. 30, 1994, abandoned.

[30] Foreign Application Priority Data

Apr. 14, 1994 [IT] Italy ................................. MI94A0709

[51] Int. Cl.[7] .................................................. B32B 31/20
[52] U.S. Cl. ...................... 427/195; 427/389.8; 427/180; 427/375; 264/136; 264/137; 428/920; 428/921
[58] Field of Search ............................ 442/417; 428/920, 428/921; 156/236, 383; 264/136, 137; 427/195, 389.8, 180, 375

[56] References Cited

U.S. PATENT DOCUMENTS

| | | | |
|---|---|---|---|
| 3,663,720 | 5/1972 | Thompson | 117/70 |
| 4,264,671 | 4/1981 | Gillern et al. | 428/273 |
| 4,402,892 | 9/1983 | Helser | 264/42 |
| 4,888,235 | 12/1989 | Chenoweth et al. | 428/284 |
| 5,126,076 | 6/1992 | Graf et al. | 428/243 |

FOREIGN PATENT DOCUMENTS

| | | |
|---|---|---|
| 0036616 | 8/1981 | European Pat. Off. . |
| 2463159 | 2/1981 | France . |
| 2605974 | 8/1977 | Germany . |
| 55-152897 | 11/1980 | Japan . |
| 59-49928 | 7/1984 | Japan . |
| 0219492 | 10/1990 | Japan . |
| WO 84/04727 | 12/1984 | WIPO . |

OTHER PUBLICATIONS

"Use of Plastics in Building Structures and Parts of Buildings," A.M. Ivanov, ed., English translations of pp. 85–86, 66–67, 174, 268, 271 and 505.

"Sovetskaya Encyclopaedia" Publishing House, Moscow, 1977, English translations of pp. 498–502 (fragments).

WPI/Derwnet Abstracts Database Accession No. 90–278513, abstract of JP 21–94942 [Kubota Co.].

Patent Abstracts of Japan, abstract of JP 21–94942.

Copy of European Search Report for EP 94 20 2814 dated Dec. 1, 1995.

*Primary Examiner*—Elizabeth M. Cole
*Attorney, Agent, or Firm*—Pitney, Hardin, Kipp & Szuch, LLP.

[57] ABSTRACT

Fireproof panels, and methods for their construction are provided. The fireproof panels comprise at least one sheet including a layer of glass fibres impregnated with at least one fireproof resin free from solvent. The method for the construction includes the successive steps of distributing a fireproof resin in the form of a powder free from solvents on a layer of glass fibres, subjecting the latter to a first compression and heating step to soften the resin and, to a second compression and heating step to cross-link the resin and form the said panel. The panels find particular use in the production of partitions and furnishings.

11 Claims, 1 Drawing Sheet

FIREPROOF PANEL AND METHOD FOR ITS MANUFACTURE

This application is a continuation of application Ser. No. 08/315,564, filed Sep. 30, 1994, now abandoned.

FIELD OF THE INVENTION

In its more general aspect, the present invention relates to panels or like structures which are fireproof and are usable as constituent elements of partitions or furniture.

Moreover the present invention relates to a method for the production of fireproof panels suitable for the production of partitions and furniture for ships or aircraft, as well as panels obtained by this method.

BACKGROUND OF THE INVENTION

In the field of furnishing equipment for aircraft and ships, particularly for merchant ships, there is a great need for structural elements such as bulkheads and elements of furniture made from fireproof materials which do not transmit flames and form a barrier to the propagation of heat, without giving off fumes or toxic vapours.

The materials usable for this purpose must answer very precise and often very strict requirements set out in the laws in force in various countries. In Italy, for example, these requirements are established by the regulations of the Italian Register of Shipping (RINA), prepared in accordance with international shipping-safety standards established by the SOLAS Convention 74(83).

In addition to satisfying this primary requirement, research has for some time been directed at finding materials which enable the manufacture of lightweight structural elements, including self-supporting elements, with little bulk and which are readily workable by a machine so as to be very versatile with regard to their use or applications.

It is known that until now this research has given results which are not fully acceptable since, in general, the materials proposed do not answer the primary requirements listed above.

The problem at the basis of the present invention is that of providing a fireproof panel suitable for the manufacture of partitions and furnishings for ships and aircraft which has all the properties specified above.

SUMMARY OF THE INVENTION

This problem has been resolved by a fireproof panel characterised in that it includes at least one sheet comprising a layer of glass fibres impregnated with at least one fireproof resin free from solvents.

A phenol-formaldehyde, particularly a novolac, resin is preferably used as the fireproof resin.

The use of the novolac resin LERIPHEN SM 1112 is particularly advantageous.

In a preferred embodiment of the invention, the fireproof panel includes at least one element which has two such sheets between which is interposed an aluminium honeycomb structure.

The present invention also relates to a method for the production of fireproof panels suitable for the production of partitions and furnishings, including at least one sheet of glass fibres, characterised in that it includes the successive steps of:

distributing a fireproof resin uniformly, in the form of a powder free from solvents, on a layer of glass fibres in quantities of at least 5 g per 100 g of the glass fibres, compressing the layer and heating it to a temperature at which the resin softens for sufficient time to cause the softening thereof, compressing the layer further at the cross-linking temperature of the resin to obtain the said sheet.

To advantage the fire-proof resin is a phenol-formaldehyde resin.

The quantity of fireproof resin distributed on the layer of glass fibres is preferably between 5 and 6 g per 100 g of glass fibres.

Preferably the step of compression and softening of the resin is carried out at a temperature of 80–100° C., at a pressure of 1.5–2 atmospheres and for 5–7 minutes and the step of compression and cross-linking of the resin is carried out at a temperature of 180–220° C., at a pressure of 1.5–2 atmospheres and for 5–7 minutes.

Although a single press can be used, in a preferred embodiment of the present invention, the compression steps are carried out by placing the said layer between the heated surfaces of respective presses, one for compression at the softening temperature of the resin and the other for compression at the cross-linking temperature of the resin.

During the compression and softening of the resin, the surfaces of the respective press are preferably heated to 90° C.

During the compression and cross-linking of the resin, the surfaces of the respective press are preferably heated to 200° C.

A phenol-formaldehyde resin which is particularly useful for the method described above is the novolac resin LERIPHEN SM 1112 made by the firm Industrie Chimiche Leri.

BRIEF DESCRIPTION OF THE DRAWINGS

The foregoing object and many of the attendant advantages will become more readily apparent from the following description and the accompanying drawing wherein.

DETAILED DESCRIPTION OF THE INVENTION

Figure 1:
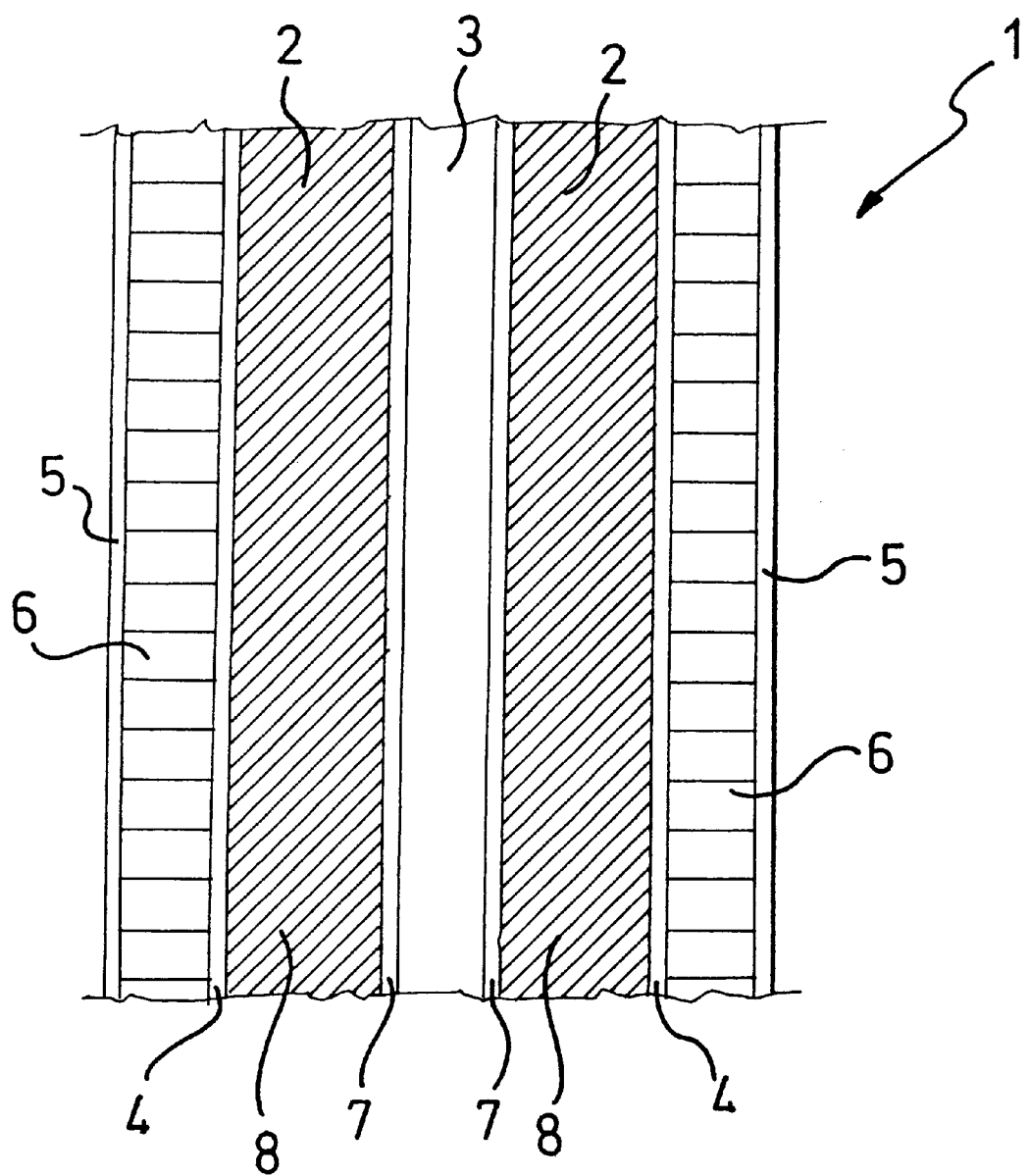
FIG. 1 is a schematic section of part of a fireproof panel manufactured with the use of the sheets produced by the method of the invention.

The fire-resisting properties of phenol-formaldehyde resins have been known for some time but fireproof panels and sheets made with the use of these resins, and able to satisfy the requirements set out above, are not known.

The reason for this must be attributed to the fact that these panels or sheets, if prepared by the usual methods of impregnation based on contact with solutions of the resin in organic solvents, have good fireproof and heat-shielding properties but when exposed to high temperatures, inevitably give off vapours and toxic gases.

With the method of the present invention, instead, it is found, surprisingly, that perfect impregnation of the layers of glass fibres with the selected fireproof resin is obtained, particularly with a phenol-formaldehyde resin, without the use of any solvent, simply by softening the resin applied in the dry, powdered state, without organic solvents, by mild compression (1.5 to 2 atmospheres) for example between the plates of a press heated to 80–100° C. for 5–7 minutes. In these conditions the resin acquires a treacle-like consistency and impregnates the fibres uniformly.

A second compression step, at the same pressure but at a higher temperature (180 to 220° C.), between the heated plates of a press for 5 to 7 minutes, causes cross-linking of the resin, enabling sheets to be obtained which not only have very good fire-resisting and heat-shielding properties but are also easy to handle in that they are self-supporting.

If an aluminium honeycomb structure is interposed between two sheets prepared by the method of the invention with the use of fixing means such as a fire-proof glue which does not give off toxic gas or vapour at high temperatures, such as, for example, the adhesive polyurethane XC 189 E made by the firm EXCEL or the adhesive DUNAPOL SP 1500 made by the firm DUNA-CORRADINI, panels are obtained which may be used in the manufacture of partitions, bulkheads and furnishing elements such as furniture, particularly for ships.

Further advantages and characteristics of the invention will become more apparent from the embodiment of the method described above and from the results of tests carried out on fireproof panels and sheets made by this method, given below by way of non-limitative example.

EXAMPLE

A phenol-formaldehyde resin of the novolac type sold by INDUSTRIE CHIMICHE LERI under the name LERIPHEN SM 1112 was distributed uniformly over a 1.2 mm-thick layer of glass fibres in quantities of 5 g per 100 g of glass fibre.

The layer was then compressed to a pressure of 2 atmospheres between the plates of a press heated to a temperature of 90° C. so as to cause the softening of the resin and the complete impregnation of the layer with the resin itself.

The compression and the heating lasted for 7 minutes after which the layer was transferred to another press. Here the layer was compressed to a pressure of 2 atmospheres between two plates heated to a temperature of 200° C. for 7 minutes, thus causing the cross-linking of the resin and the formation of a sheet.

After cooling to ambient temperature, the sheet had a density of 1.35 kg/dm$^3$ and was ready for use in the production of fire-proof panels.

The fire-resistant properties of the sheet prepared in this manner were checked by a test carried out in accordance with the RINA regulations, also in accordance with international shipping-safety standards governed by the SOLAS Convention 74(83).

The tests were carried out using apparatus and procedures meeting the following criteria pursuant to the RINA standard:

Furnace

The furnace consists principally of a tube of an alumina refractory material having a mass density of 3,000±300 kg/m$^3$ and a height of 150±1 mm, with an inner diameter of 75±1 mm and a wall thickness of $10\pm_0^2$ mm. The overall wall thickness with applied refractory cement to retain the electrical winding should not exceed 13 mm. The furnace tube is provided with one or more electrical heating coils and is located within an insulated surround, completed with a top and bottom plate of marine board having a thickness of 10±1 mm. To the lower end of the furnace is attached a cone-shaped air flow stabilizer 500 mm long and reducing from a 75 mm internal diameter at the top to a 9 mm internal diameter at the lower end. The stabilizer can be made of steel sheet, approximately 1 mm thick, and should be finished smooth on the inside, particular attention being given to the smoothness and the tightness of the joint with the furnace which should be provided with a refractory fibre sheet seal. The upper half height of the stabilizer should be insulated on the outside with a layer of refractory fibrous felt having a nominal thickness of 25 mm. At the open top of the furnace a draught shield, which may be made of the same material as the stabilizer cone, should be provided having an internal diameter of 75 mm and a height of 50 mm. The draught shield should be insulated on the outside with a layer of the fibrous felt having a nominal thickness of 25 mm.

Furnace stand

The furnace is mounted on a stand with a clearance of approximately 250 mm between the floor and the lower end of the stabilizer. This clearance must be protected against disturbance by air currents. An adequate protection can be provided by using shields around the stand to a height of approximately 550 mm from the floor.

Furnace calibration and control

A calibrating test with the specimen basket and holder removed should be performed on a new furnace or on an existing furnace when so required. The energy input to the furnace should be adjusted so that the furnace thermocouple (described below) gives a steady reading of 750°±10° C. In stabilized conditions the wall temperature at the furnace should be measured by an optical micropyrometer at intervals of 10 mm on three equally spaced vertical axes. The wall temperature should not vary by more than 50° C. over a mid-height length of 100 mm and this should give an average wall temperature of about 850° C. This provides a constant temperature zone for the specimen. Separate windings may optionally be provided at each end of the furnace tube, controlled independently to obtain the constant temperature zone.

To minimize temperature fluctuations in the furnace it is necessary to use a voltage stabilizer in the circuit, able to maintain voltage within ±5 percent of the nominal value. Automatic thermostatic control of the furnace is not to be used during test.

Temperature measurement

Temperatures should be measured by means of insulated sheathed thermocouples having an outside diameter of 1.5±0.1 mm with thermo-electric wires of approximately 0.2 mm diameter. Before using for test, new thermocouples should be aged in the heated furnace atmosphere to slightly oxidize their outer sheaths. The temperature should be recorded by an instrument having a measuring range that corresponds with the temperature changes that occur during the tests. Measurement should be made at intervals of not more than 10 seconds. The electromotive force temperature conversion process of the recording device should have an accuracy of at least 0.5 percent, and the thermocouples should have a time constant in the range of 15 to 25 seconds.

Location of thermocouples

Three thermocouples should be used, the furnace thermocouple to measure the furnace temperature, the surface thermocouple to measure the temperature at the surface of the specimen and the specimen thermocouple to measure the temperature in the center of the specimen. The furnace thermocouple should be located with its hot junction 10±0.5 mm from the wall of the furnace and at the mid-height of the constant temperature zone as defined by the wall temperature. A method of maintaining the correct distance from the wall is by the use of a guide attached to the draught shield. The surface thermocouple should, prior to the test, have its hot junction next to the surface of the specimen at mid-height and be in contact with the specimen. The specimen thermocouple should be located with its hot junction in the center of the specimen and should be inserted from the top through a hold of 2 mm diameter.

Specimen holder and insertion device

The specimen is placed in a basket made of nickel-chromium alloy or heat-resisting steel. At the bottom of the holder, a fine metal gauze in heat-resisting steel should be provided. The mass of the basket should be between 6±0.2 g. The holder is suspended from the lower end of an adjustable tube of heat-resisting steel, having an outside diameter of approximately 6 mm and a bore of 4 mm. The specimen insertion device consists essentially of a metallic sliding rod moving freely in a vertical tube fitted to the side of the furnace. The heat-resisting steel tube with the specimen holder is fixed by a space bar to the sliding rod. The design of the insertion device should be such that the specimen can be introduced into the furnace rapidly and without any shock. The inserted specimen should occupy a specified position in the furnace in the middle of the constant temperature zone and equidistant from the walls.

Specimen viewing device

A mirror should be mounted above the furnace for observation of any evidence of flaming. It should be mounted in such a way that it is possible to view the specimen continuously following insertion.

The RINA requirements for test specimens are as follows:

Preparation of specimens

The specimens should be as representative as possible of the average properties of the sample and should be prepared to the size defined below.

If the thickness of the material is less than 50 mm, the specimen must be made of sufficient layers to achieve the thickness required below. The layers should occupy a horizontal position and should be held together firmly in the specimen holder. The density of the specimen should be representative of the density of the material.

Materials or composite materials which involve thin surface laminations should be tested without such surface laminates unless otherwise specified by the Administration involved.

For composite materials of a thickness such that a number of layers cannot be put together to give a specimen of the specified size as required, the specimen should be prepared to the required thickness by proportionally adjusting the thickness of the different components. The top and bottom faces of the specimen should be the finished faces of the material.

If it is not possible to follow this procedure to prepare the specimen, tests should be performed on the individual components and reported accordingly.

Number and size

For test purposes, five cylindrical specimens should be prepared as described above. The nominal dimensions and tolerances for the specimen sizes are as follows:

| | | |
|---|---|---|
| diameter: | $45 \pm {}^0_2$ mm | |
| height: | $50 \pm 3$ mm | |
| volume: | $80 \pm 5$ cm$^3$ | |

Conditioning

The specimens should be conditioned in a ventilated oven maintained at 60°±5° C. for at least 20 hours and cooled to ambient temperature in a desiccator prior to the tests. The weight of each specimen shall be determined before test.

The test procedure is as follows:

Apparatus

Before starting the test, it is necessary to ascertain that the whole equipment is in good working order—for example, the stabilizer cone is clean, the insertion device is working smoothly, the specimen holder occupies the exact position in the furnace and the furnace thermocouple is accurately located.

The equipment should be protected against drafts and not be exposed to direct sunlight or artificial illumination.

The furnace with an empty specimen basket in position should be heated and the furnace temperature stabilized at 750°±10° C. For a minimum period of 10 minutes before the insertion of a specimen and during the test no adjustments should be made in the energy input to the furnace.

Insertion of specimens

The specimen should be placed in the holder described above. It should be inserted in the furnace taking not more than 5 seconds for this operation.

Duration of heating

The heating period commences with the insertion of the specimen in the furnace and should be continued for 20 minutes, or until peak temperatures have been passed.

Test observations

A record should be made of the temperature readings from the three thermocouples during the heating period and note taken of the occurrence and duration of any sustained flaming. The weight of each specimen after test shall be determined. Sustained flaming shall be taken as continuous presence of flames in the furnace.

Number of specimens tested

The test is carried out on five specimens, prepared as specified in above. The materials are classified as follows:

Classification of Materials

Non-combustibility 1 the average of the five maximum readings of furnace thermocouples does not show a rise above the initial furnace temperature of more than 50° C.;

2 the average of the five maximum readings of surface thermocouples does not shown a rise above the initial furnace temperature of more than 50° C.;

3 the average of all recorded maximum durations of sustained flaming does not exceed 10 seconds; and 4 the average loss of weight for the specimens after test is not more than 50 percent of the original weight after conditioning.

Combustibility

If one of the four criteria is not satisfied the material is deemed combustible.

More particularly, several sheets produced by the method of the embodiment above, were superposed until a 50 mm-thick slab was obtained, the individual sheets being held together by a wire cage.

Temperature-measuring thermocouples were applied to the centre of the thickness of the slab and to its surface. The slab thus arranged was introduced into an oven which had previously been brought to a running temperature of 750 +/−10° C. and the temperature at the centre and the surface of the slab were then detected, as was the temperature in the oven, for a period of 20 minutes. Any appearance of flames was also checked.

The test was carried out on 5 samples, giving the results shown in the following table:

| Sample No. | Tof (° C.) | Tmax,f (° C.) | Tmax,s (° C.) | Tmax,c (° C.) |
|---|---|---|---|---|
| 1 | 740 | 780 | 780 | 810 |
| 2 | 740 | 790 | 765 | 805 |
| 3 | 740 | 780 | 785 | 795 |
| 4 | 740 | 780 | 780 | 815 |
| 5 | 740 | 780 | 765 | 800 |
| Total | 3700 | 3910 | 3875 | 4025 |
| Average | 740 | 782 | 775 | 805 | in which Tof represents the initial temperature of the oven, Tmax,f is the maximum temperature reached by the oven, Tmax,s is the maximum temperature reached at the surface of the slab and Tmax,c is the maximum temperature at the centre of the slab.

According to RINA standards, a fire-proof material must result in a maximum rise in temperature in the oven of no more than 50° C. degrees above the initial temperature of the oven. From the table one may deduce a maximum rise of 42° C. degrees (Tmax,f–Tof).

Again, according to the said regulations, the maximum rise in temperature at the surface of the sample must not exceed the initial temperature of the oven by more than 50° C. degrees; in the present case a rise of 35° C. degrees is found.

The RINA regulations also provide that, should flames appear, these must not last for more than 10 seconds. The slab subjected to the test did not give rise to any flames.

Finally the loss in weight of the slab at the end of the test was 2.04% of the original weight, well below the 50% limit allowed by the regulations mentioned above.

The slab produced by the method of the invention may be used for manufacturing fireproof panels.

One embodiment of such panels will now be described with reference to the appended drawing, in which: FIG. 1 is a schematic section of part of a fireproof panel manufactured with the use of the sheets produced by the method of the invention.

In the drawing, a fireproof panel according to the invention is generally indicated 1.

It comprises two flat elements indicated 2 and 2' respectively, placed facing each other, parallel and separated by an interspace 3.

When the elements 2, 2' of the panel 1 are put to use in partitions and furnishings, they will be supported by frames not shown.

The elements 2, 2' have the same structure but are placed in mutually mirror-imaged positions. The structure of only one of the two flat elements 2, 2' will therefore be described below.

The element 2 includes two sheets, indicated 4 and 5 respectively, placed facing and parallel to each other. The sheet 5 together with its corresponding sheet of the flat element 2' define the sides of the panel 1.

Between the sheets 4 and 5 is a honeycomb structure 6 of metal, preferably aluminium, held in contact with both of the sheets 4, 5, being glued to them, and acting as a support for them.

In addition, between the sheet 4 and a further sheet 7, is a mat 8 of aluminosilicaceous fibres. The sheet 7, together with its corresponding sheet in the flat element 2', define the interspace 3.

The sheets, 4, 5 and 7 are produced by the method of the present invention.

The panel described above was subjected to a test for resistance to combustion for conformity with the international safety regulations.

In particular the panel subjected to testing had the following structural data:

| | |
|---|---|
| thickness of the sheets | 1 mm |
| thickness of the honeycomb structure | 10 mm |
| thickness of the mat | 17 mm |
| thickness of the interspace | 10 mm |

The honeycomb structure, the sheets and the mat were glued together with the fireproof polyurethane adhesive XC 189 E made by the company EXCEL (France).

The said panel was applied vertically to the opening of an oven so as to close this opening exactly and so that only one face of the panel was exposed to the flames.

Five thermocouples were arranged over the surface of the panel facing out of the oven to detect its temperature. The same number of thermocouples were arranged in the oven to measure its temperature.

The temperature within the oven was raised gradually over 30 minutes along a predetermined gradient and, at the same time, the values of the temperature at the surface of the panel facing outwardly of the oven were determined.

From the average of the readings of the five thermocouples, the following results were obtained:

| | 5' | 10' | 15' | 20' | 25' | 30' |
|---|---|---|---|---|---|---|
| Temperature of the oven (° C.) | 508 | 687 | 743 | 798 | 819 | 834 |
| Temperature of the outer face of the panel (° C.) | 28 | 29 | 35 | 46 | 65 | 93 |

As may readily be deduced from the data given above, the fireproof panel manufactured with the use of the sheets produced by the method of the invention, as well as not allowing the passage of flames, had excellent heat-shielding properties.

In addition, at the end of the test, the panel was whole.

I claim:

1. A method for the production of fireproof panels according to RINA standards, said panels including at least one fireproof sheet which consists of glass fibers and a fireproof phenol-formaldehyde resin, the method comprising the successive steps of:
   forming a layer of the glass fibers:
   distributing the fireproof phenol-formaldehyde resin uniformly, in the form of a powder free from solvents, on the layer of glass fibers, in quantities of at least 5 g but no higher than 6 g of the resin per 100 g of the glass fibers;
   simultaneously compressing and heating the layer and the distributed resin to a temperature at which the resin softens for sufficient time to cause the softening of the resin, thereby impregnating the layer of glass fibers with the resin to form an impregnated layer; and
   compressing the impregnated layer at the cross-linking temperature of the resin to obtain said fireproof sheet.

2. A method according to claim 1, wherein the step of compression and heating to the softening temperature of the resin is carried out at a temperature of 80–100° C. at a pressure of 1.5–2 atmospheres and for 5–7 minutes.

3. A method according to claim 1, wherein the step of compression at the cross-linking temperature of the resin is carried out at a temperature of 180–220° C., at a pressure of 1.5–2 atmospheres and for 5–7 minutes.

4. A method according to claim 1, wherein the step of compression and heating to cause softening is carried out by placing the layer between heated surfaces of a first press and the step of compression at the cross-linking temperature is carried out by placing the layer between heated surfaces of a second press.

5. A method according to claim 4, wherein, in the step of compression and heating to cause softening of the resin, said heated surfaces of the first press are heated to 90° C.

6. A method according to claim 4, wherein, in the step of compression at the cross-linking temperature of the resin, said heated surfaces of the second press are heated to 200° C.

7. The method of claim 1, wherein the step of compression and heating to the softening temperature of the resin and the step of compression at the cross-linking temperature of the resin are carried out at the same pressure.

8. The method of claim 1, wherein the step of compression and heating to the softening temperature of the resin is carried out at a pressure of 1.5–2 atmospheres.

9. The method of claim 1, wherein the step of compression at the cross-linking temperature of the resin is carried out at a pressure of 1.5–2 atmospheres.

10. The method of claim 1, further comprising laminating two of said fiber sheets on either side of a core to comprise said fireproof panel.

11. The method of claim 10, wherein the core comprises an aluminum honeycomb, and the two fiber sheets are fixed to the core using a fireproof adhesive.

* * * * *

UNITED STATES PATENT AND TRADEMARK OFFICE
CERTIFICATE OF CORRECTION

PATENT NO. : 6,149,971
DATED : November 21, 2000
INVENTOR(S) : Adriano Lusardi

It is certified that error appears in the above-identified patent and that said Letters Patent is hereby corrected as shown below:

Title page,
Add in line [73]: B & B Italia S.p.A., Milan, Italy

Signed and Sealed this

Ninth Day of October, 2001

*Attest:*

NICHOLAS P. GODICI
*Attesting Officer*    *Acting Director of the United States Patent and Trademark Office*